United States Patent [19]
Westberg et al.

[11] Patent Number: 5,115,145
[45] Date of Patent: May 19, 1992

[54] MOTOR VEHICLE SECURITY SYSTEM

[75] Inventors: Frederick W. Westberg, Elyria; Dean P. Brondos, Rocky River, both of Ohio

[73] Assignee: Dittrick/Christensen Enterprises, Inc., Champaign, Ill.

[21] Appl. No.: 586,438

[22] Filed: Sep. 21, 1990

[51] Int. Cl.⁵ .............................................. B60R 25/10
[52] U.S. Cl. ................................... 307/10.3; 307/10.2; 180/287
[58] Field of Search ........................... 307/10.1–10.6; 180/287; 340/426; 123/198 B, 146.5 B, 179 BG, 179.3, 179.5

[56] References Cited
U.S. PATENT DOCUMENTS

| | | | |
|---|---|---|---|
| 4,403,675 | 9/1983 | Cardwell | 180/287 |
| 4,754,838 | 7/1988 | Cody | 180/287 |
| 4,792,792 | 12/1988 | Costino | 340/426 |

Primary Examiner—A. D. Pellinen
Assistant Examiner—David Osborn
Attorney, Agent, or Firm—Philip L. Bateman

[57] ABSTRACT

A security system for motor vehicles enables the ignition switch to be turned to the "off" position and the key to be removed without turning off the engine and accessories. Normal driving operation is restored by reinserting the key, turning the ignition switch to the "on" position, and preparing the vehicle for driving. If a person without the ignition key attempts to drive the vehicle, the engine turns off. The security system includes a solenoid, a switch means to energize and deenergize the solenoid, an ignition bypass line and switch, and a starter-override switch which prevents the flow of current to the starter should the ignition switch be inadvertently turned past the "on" position to the "start" position.

3 Claims, 1 Drawing Sheet

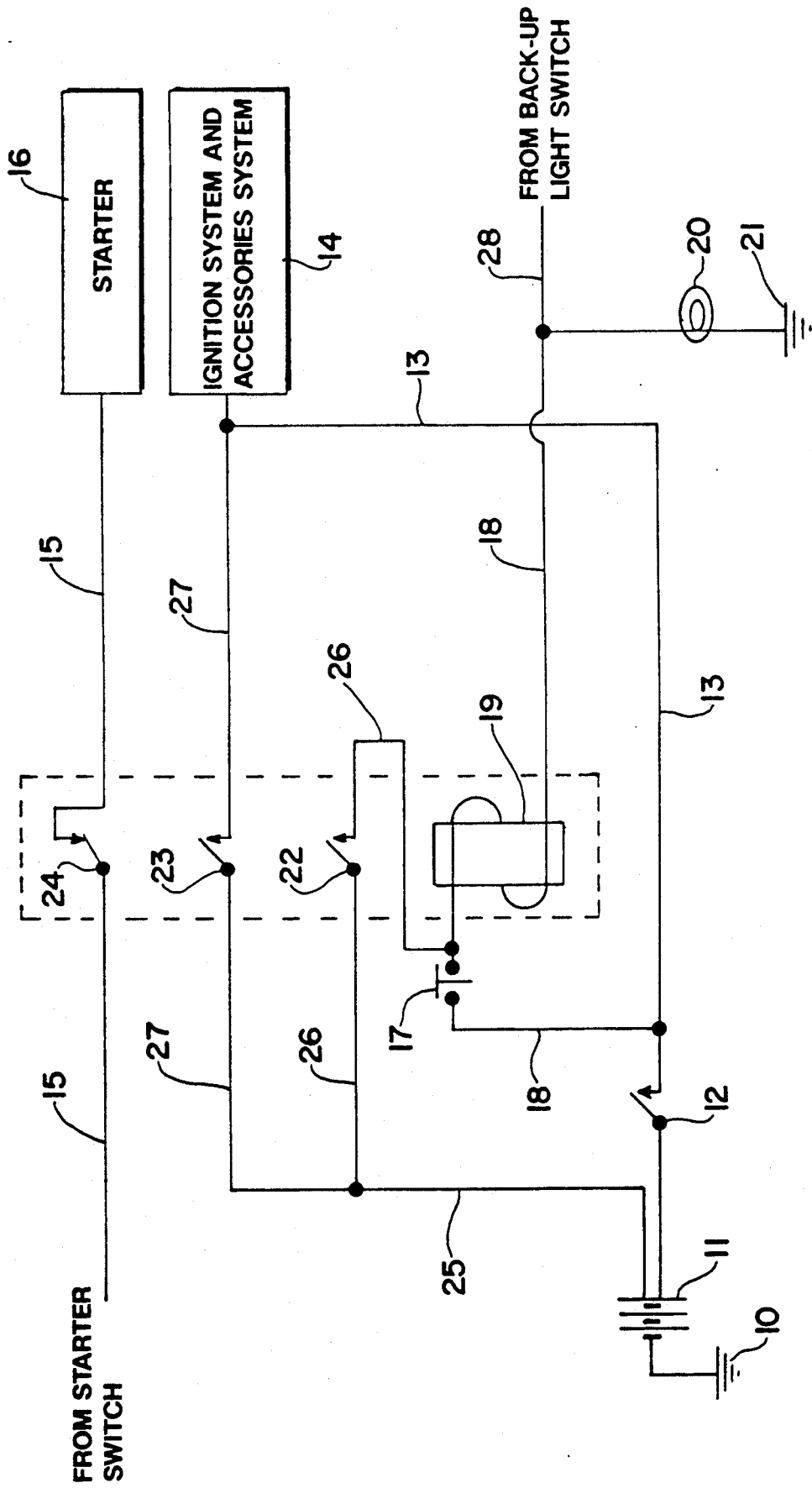

MOTOR VEHICLE SECURITY SYSTEM

FIELD OF THE INVENTION

This invention relates to motor vehicles. More particularly, this invention relates to security systems for motor vehicles.

BACKGROUND OF THE INVENTION

It is often desirable or necessary to leave a motor vehicle unattended with its engine running. Diesel trucks are routinely left running during cold weather because of the difficulty in restarting the engines. Ambulances, fire engines, police cars, and other emergency vehicles are often left running at the site of emergencies to both ensure they are ready to be driven away and to power auxiliary equipment which must continue to run. And there are countless times when delivery vehicles or personal vehicles are left running for short periods of time to avoid wear and tear on the engine and to save gasoline as the operator performs an errand. In these situations, there is a risk that an unauthorized person may attempt to drive the vehicle. Locking the doors to the vehicle provides some security, but is not foolproof. Some vehicles do not have doors (construction equipment, boats, etc.), locked doors can be forced open, and locking the doors serves no purpose when operation of the vehicle by a passenger, such as a child, is to be prevented. Accordingly, there is a need for a security system for motor vehicles which enables them to be left unattended with their engines running, but without the risk of their being driven by an unauthorized person.

A security system for motor vehicles is disclosed in Cardwell, U.S. Pat. No. 4,403,675, issued Sep. 13, 1983. The Cardwell system is activated by engaging the emergency brake and actuating a momentary switch. Once activated, the system bypasses the ignition switch so that the switch can be turned to the "off" position and the key withdrawn without turning off the engine. If the emergency brake is released without the key being first reinserted and the ignition switch turned to the "on" position, the engine turns off. The Cardwell system has apparently failed to achieve commercial success because of two disadvantages. First, the emergency brake must be engaged before the system can be activated. Secondly, and more importantly, the engine of a motor vehicle modified with the Cardwell security system is susceptible to damage if the ignition switch is inadvertently moved past the "on" position to the "start" position, thus engaging the starter into a running engine.

The security system disclosed in Cody, U.S. Pat. No. 4,754,838, issued Jul. 5, 1988, is similar in many respects to the Cardwell system. The Cody system is activated by pushing down and then pulling up on a switch. The system is deactivated by reinserting the key, moving the ignition switch to the "on" position, and then pushing down on the switch. The Cody system is, accordingly, relatively cumbersome to operate and suffers from the same danger as Cardwell in that inadvertently moving the ignition switch to the "start" position can result in serious engine damage.

SUMMARY OF THE INVENTION

The object of this invention is to provide an improved security system for motor vehicles to enable the engines to be left running while the vehicle is unattended without the danger of an unauthorized person gaining access to the vehicle and driving it. A more particular object of this invention is to provide such a system which is easy to actuate, automatically disengages, and which eliminates the danger of engine damage.

We have discovered a security system for motor vehicles containing an engine ignition system controlled by a key-actuated ignition switch having "off", "on", and "start" positions. The security system comprises: (a) a solenoid; (b) a switch means which is closable by the vehicle operator to energize the solenoid when the engine is running and the vehicle prepared for parking, and which is automatically opened to deenergize the solenoid as the vehicle is prepared for driving; (c) a bypass line from the battery to the ignition system and accessories system; (d) a bypass switch in the bypass line, which bypass switch is normally open but is closed when the solenoid is energized; and (e) a starter-override switch in the existing line from the battery to the starter, which starter-override switch is normally closed but is opened when the solenoid is energized.

This security system has the following features. First, if the switch means is closed by the vehicle operator when the engine is running and the vehicle prepared for parking, the solenoid is energized and the bypass line provides current to the ignition system and accessories system so that the ignition switch can be turned to the "off" position and the ignition key removed without turning off the engine and accessories. Second, if while the solenoid is energized, the ignition key is reinserted and the ignition switch turned to the "on" position, the open starter-override switch prevents the flow of current to the starter should the ignition switch be inadvertently turned past the "on" position to the "start" position and the solenoid is deenergized as the vehicle is prepared for driving. Third, if while the solenoid is energized, a person without the ignition key attempts to drive the vehicle, the switch means of the security system automatically opens and the engine turns off.

BRIEF DESCRIPTION OF THE DRAWING

The drawing is a schematic diagram of one embodiment of this invention incorporated into the ignition circuit of a conventional motor vehicle.

DETAILED DESCRIPTION OF THE INVENTION

This invention is best understood by reference to the drawing. The drawing shows a schematic diagram of the ignition circuit of a conventional motor vehicle having an automatic transmission to which has been added the security system of this invention. The ignition circuit contains a chassis ground 10, a battery 11, and a key-actuated ignition switch 12 having "off", "on", and "start" positions. The ignition switch, generally located on the motor vehicle's steering column, is shown in the open ("off") position. The switch is closed when the ignition key is inserted into the switch and turned to the "on" position. Current then flows through line 13 to the ignition system (coil, distributor, spark plugs, etc.) and to the accessories system (heater, air conditioner, radio, etc.), both of which are represented as box 14. The ignition switch remains closed as the key is turned to the "start" position to close the starter switch (not shown), send current through line 15, and energize the starter 16. After the engine starts, the key is returned to the "on" position. Without the security system of this invention, movement of the ignition key to the "off" position opens the ignition switch which, in turn, stops the flow of current to the ignition system and accessories system and thereby turns off the engine and various components of the accessories system.

The operation of the security system of this invention is as follows. When it is desired to leave the engine running with the vehicle unattended, the vehicle is first prepared for parking just as if the security system were not present, namely, if the vehicle has an automatic transmission, the transmission is shifted to the "park" position, and if the vehicle has a manual transmission, the transmission is placed into neutral and the parking (also known as emergency) brake is engaged. The momentary switch 17 is then activated. The momentary switch is typically mounted on the dashboard within convenient reach of the vehicle operator. The closing of the momentary switch allows the momentary flow of current through line 18 to a solenoid 19 and on to back-up light 20 and ground 21. In place of a back-up light, any other vehicle component can be substituted which is unenergized when the vehicle is prepared for parking and which becomes energized as the vehicle is prepared for driving. For example, the brake light is conveniently used for this purpose when adding the security system of this invention to a vehicle having a manual transmission. The energizing of the solenoid moves the three switches shown within the dotted line around the solenoid. Holding switch 22 is closed, bypass switch 23 is closed, and starter override switch 24 is opened. The solenoid and the three switches are commercially available in the form of a three-pole relay. Other types are solenoids and switches include power transistors, electro-optical switches, silicon-controlled switches, and other devices which start or stop the flow of current in other lines as they are energized or deenergized. It is also understood that a plurality of bypass lines and bypass switches are typically present in a commercial application.

When the momentary switch is immediately released, current continues to flow through lines 25 and 26, the holding switch, and the solenoid, thus leaving the bypass switch closed and the starter override switch open.

The ignition can now be turned to the "off" position and the key removed. Even though ignition switch 12 is now open and no current flows through line 13, current continues to flow through line 27 and the bypass switch 23 to the ignition system and to the accessories system, and the engine and all accessories continue to operate. The motor vehicle is, nevertheless, secure against theft. Most modern motor vehicles are equipped with steering column locks which prevent the steering wheel from moving and which prevent the movement of an automatic transmission out of the "park" position when the ignition switch is in the "off" position. The motor vehicle is additionally rendered secure by the connection to the line between the back-up light switch and the back-up light, or other vehicle component which becomes energized as the vehicle is prepared for driving. As illustrated in the drawing, if the transmission is moved into the "reverse" position, the back-up light switch is closed and current flows through line 28. Current flow through the solenoid then stops because the electric potential is equal on both sides. As soon as current flow through the solenoid stops, the three solenoid-controlled switches return to their original positions: the holding switch opens, the bypass switch opens and current to the ignition system and accessory system is stopped, and the starter override switch closes. The engine turns off.

Assume now that, as above, the motor vehicle operator has depressed the momentary switch while the engine is running and the vehicle is prepared for parking so as to energize the solenoid and move the three solenoid-controlled switches. The ignition is turned to the "off" position and the key is removed. The engine and accessories continue to operate. Now assume that the operator, with the ignition key, returns to the vehicle and wants to drive away. The operator inserts the ignition key back into the ignition switch and moves it to the "on" position. If the operator accidentally moves the key too far and engages the starter switch, the starter is not activated because the override switch is open. Accordingly, the potential for engine damage is eliminated. The movement of the key to the "on" position unlocks the steering column. As the vehicle is prepared for driving (by, for example, moving the transmission into "reverse"), current flow through the solenoid stops, the solenoid-controlled switches return to their original positions, and the motor vehicle is operable just as if the security system were not present.

We claim:

1. A security system for motor vehicles containing an engine ignition system controlled by a key-actuated ignition switch having "off", "on", and "start" positions, the security system comprising:
   (a) a solenoid;
   (b) a switch means which is closable by the vehicle operator to energize the solenoid when the engine is running and the vehicle prepared for parking, and which is automatically opened to deenergize the solenoid as the vehicle is prepared for driving;
   (c) a bypass line from the battery to the ignition system and accessories system;
   (d) a bypass switch in the bypass line, which bypass switch is normally open but is closed when the solenoid is energized; and
   (e) a starter-override switch in the existing line from the battery to the starter, which starter-override switch is normally closed but is opened when the solenoid is energized;

such that: (1) if the switch means is closed by the vehicle operator when the engine is running and the vehicle prepared for parking, the solenoid is energized and the bypass line provides current to the ignition system and accessories system so that the ignition switch can be turned to the "off" position and the ignition key removed without turning off the engine and accessories; (2) if, while the solenoid is energized, the ignition key is reinserted and the ignition switch turned to the "on" position, the open starter-override switch prevents the flow of current to the starter should the ignition switch be inadvertently turned past the "on" position to the "start" position and the solenoid is deenergized as the vehicle is prepared for driving; and (3) if, while the solenoid is energized, a person without the ignition key attempts to drive the vehicle, the switch means of the security system automatically opens and the engine turns off.

2. The security system of claim 1 wherein the switch means comprises a momentary switch.

3. The security system of claim 2 wherein the solenoid, bypass switch, and starter-override switch comprise a multi-pole relay.

* * * * *